J. Smead.
Evaporating Pan.

N° 77,666. Patented May 5, 1868.

Witnesses
J. W. Coombs
A. Heller

Inventor
J. Smead
per Brown, Coombs & Co

United States Patent Office.

JONATHAN SMEAD, OF EAST WALLINGFORD, ASSIGNOR TO HIMSELF AND THOMAS STEWARD, OF CLARENDON, VERMONT.

Letters Patent No. 77,666, dated May 5, 1868.

IMPROVED AUTOMATIC FEEDER FOR EVAPORATORS.

The Schedule referred to in these Letters Patent and making part of the same.

TO ALL WHOM IT MAY CONCERN:

Be it known that I, JONATHAN SMEAD, of East Wallingford, in the county of Rutland, and State of Vermont, have invented certain new and useful Improvements in Automatic Feeders for Evaporating-Apparatus; and I do hereby declare that the following is a full, clear, and exact description of the same, reference being had to the accompanying drawings, making a portion of this specification, in which—

Similar letters of reference indicate corresponding parts in both figures.

Figure 1:
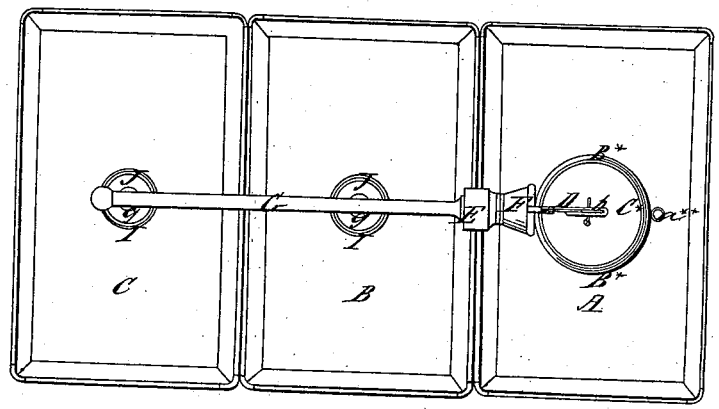
Figure 1 is a plan view of an evaporating-apparatus, fitted with feeding-mechanism made according to my invention.

This invention relates to that class of apparatus employed for evaporating saccharine liquids, such, for instance, as maple-sap, and its object is to provide an efficient automatic means of keeping the several pans of the apparatus constantly supplied with neither more nor less than the requisite quantity of sap or liquid.

The invention consists in surrounding the floats, which, resting upon the liquid in the pans just mentioned, serve to actuate the other moving parts of the feeding-mechanism, with casings, so constructed as to effectually prevent the operation of the floats from being interfered with by the ebullition of the liquid in boiling.

The invention further consists in a novel combination of parts, arranged with reference to one of the pans of the evaporating-apparatus, in such manner as to control the inflow of liquid to a reservoir-pipe, from which the other pans are supplied, as well as the flow to the pan with which such parts are more immediately connected.

The invention further consists in a novel combination of parts, whereby the passage of the liquid, from the reservoir-pipe to the pans which it is designed to supply, may be automatically controlled by the height of the liquid in such pans.

The invention further consists a novel means whereby the principal valve is enabled to operate with very great facility in shutting off the flow of sap or liquid to the apparatus, against the pressure exerted thereon by the "head" under which the liquid may flow or pass through the supply-pipe.

To enable others to understand the construction and operation of my invention, I will proceed to describe it with reference to the drawings.

A, B, and C represent three shallow pans, which, being situated upon a suitable arch or furnace, receive the liquid or sap to be boiled or evaporated.

Placed in one of the pans, for instance the pan A, is a vessel, B*, of cylindrical or other suitable shape, and provided with supporting-legs, $a^*$, which rest upon the bottom of the pan, having a double bottom, within which is a chamber, $a$, and formed with perforations, $a'$, in its sides, whereby the contents of the pan may flow into the interior of the vessel. This vessel B* constitutes a casing, within which is placed a float, C*, which may be of any suitable variety, and which is furnished with a vertical stem, $b$, provided at its upper end with a series of transverse holes, so that it may be attached to the outer end of a bent lever, D, by means of a transverse pin, with the float C*, at a greater or less distance from the point of attachment, as circumstances may require.

Provided at E is a chamber, of any suitable form, having an opening at $a''$, over or above the pan A. Fitted to one side of the chamber E is a conical case, F, the inner end of which is furnished with a valve, $c$, the stem $d$ of which, being passed longitudinally through the case, is attached to a diaphragm, $e$, which closes the outer end of the case, and is made of India rubber, in order that it may properly perform its function, which will be hereinafter fully explained.

Figure 2:
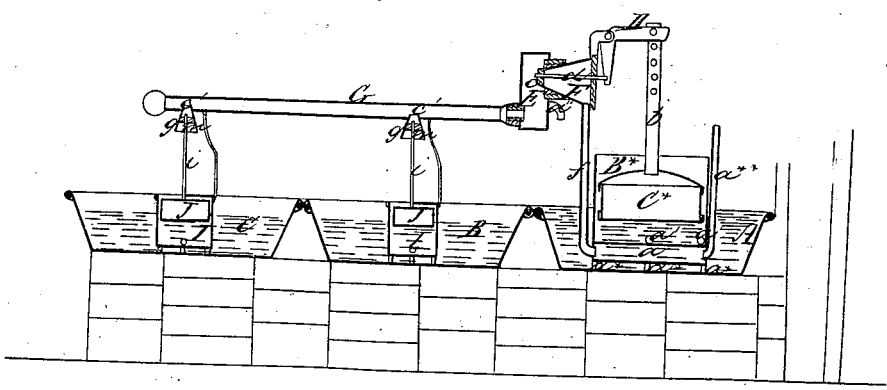
Figure 2 is a vertical longitudinal section of the same.

The stem $d$, passing through the elastic diaphragm just mentioned, is pivoted to the inner or lower end of the bent lever D, as shown in fig. 2. The case F communicates with the chamber $a$ of the vessel or casing B*, by means of a pipe, $f$, the chamber $a$ being furnished with a suitable supply-pipe, $a^{**}$, through which, under suitable pressure, the sap or liquid passes to such chamber. Extending horizontally over the remaining pans, B C, is a reservoir-pipe, G, which communicates at one end with the chamber E, and has holes or orifices, $c'$, formed in its under side, one over each of the pans B C. Each of the orifices $c'$ has fitted to and projecting downward from the same, a funnel-shaped mouth-piece, $g$. Placed in each of the pans B C is a casing, I, corresponding in construction with the casing or vessel B*, except that it has no false or double bottom. Situated in each of the casings I is a vertically-moving float, J, of any appropriate kind, the vertical stem $i'$ of each float J having a valve, $m$, affixed to its upper end, and playing within the mouth-piece $g$ of the orifice $c'$, above it, of the reservoir-pipe G, in such manner that when the float is allowed to descend, by the lessening of the quantity of sap or liquid in the pan, the sap or liquid in the reservoir-pipe will be permitted to flow therefrom, until the liquid in the pan rises to such height as to elevate the float, and press the valve into the mouth-piece $g$, around it, with sufficient tightness to effectually close the orifice $c'$, and thus prevent further outflow through the orifice to the pan, a constant and uniform supply of sap or liquid from the reservoir-pipe to the pans below the same, being thus automatically secured. The sap or other saccharine liquid, passing under a suitable head or pressure, through the pipe $a^{**}$, chamber $a$, of the vessel or casing B*, and the pipe $f$, enters the case F. When the pan A is filled to the requisite height, the float C* is forced upward, and acting through the stem $b$, bent lever D, and valve-stem $d$, operates the valve $c$, to permit the flow of sap or liquid to the chamber E, from which it not only flows to fill the reservoir-pipe G, but, after such pipe is filled, flows through the orifice $a''$ to the pan A, until the rising of the sap or liquid in the latter raises the float C*, to operate the valve $c'$, to again close the case F, thus shutting off the supply to the pan A, until the continued evaporation of its contents shall again cause the float to descend, when the filling operation will be repeated. When the valve-stem $d$ is moved inward, to open the case F, as hereinbefore explained, the elastic diaphragm $e$ is strained inward, so that when the float C* descends, the diaphragm, by its tendency to return to its normal condition, will assist the return movement of the valve against the force exerted upon the valve by the head or pressure of the sap or liquid in the case.

Inasmuch as the several floats are surrounded by their respective casings, into which, and underneath the floats, the sap or liquid passes from the pans, through the holes in the sides of the casings, as hereinbefore set forth, it follows that the liquid immediately under the floats will be rendered comparatively still, so that the floats will not be liable to be moved vertically by the ebullition of the sap or liquid in the pans.

What I claim as my invention, and desire to secure by Letters Patent, is—

1. The perforated casings, arranged within the pans, in relation with the floats operating the sap or liquid-supplying mechanism, substantially as and for the purpose specified.

2. The arrangement of the chamber E, the case F, valve $c$, with its stem $d$, and bent lever D, in relation with each other, and with the stem $b$ of the float C*, the pipe $f$, and the reservoir-pipe G, substantially as and for the purpose set forth.

3. The valves $m$, arranged upon the stems $i$ of the floats J, and in relation with the funnel-shaped mouth-piece $g$, surrounding the orifices $c'$ of the reservoir-pipe G, substantially as and for the purpose specified.

4. The elastic diaphragm $e$, arranged in the end of the case F, and in relation with the valve-stem $d$, operated by the float C* and the pipe $f$, substantially as and for the purpose specified.

JONATHAN SMEAD.

Witnesses:
JOHN A. STEWARD,
CALVIN WARNER.